(12) United States Patent
Bourgeau

(10) Patent No.: US 8,373,949 B2
(45) Date of Patent: Feb. 12, 2013

(54) HYBRID POWER PLANT FOR IMPROVED EFFICIENCY AND DYNAMIC PERFORMANCE

(75) Inventor: Edward P. Bourgeau, Houston, TX (US)

(73) Assignee: Transocean Sedco Forex Ventures Limited, Grand Cayman (KY)

( * ) Notice: Subject to any disclaimer, the term of this patent is extended or adjusted under 35 U.S.C. 154(b) by 191 days.

(21) Appl. No.: 12/816,576

(22) Filed: Jun. 16, 2010

(65) Prior Publication Data
US 2011/0309677 A1 Dec. 22, 2011

(51) Int. Cl.
*H02J 3/32* (2006.01)
(52) U.S. Cl. ............................................. 361/18; 307/48
(58) Field of Classification Search ....................... 361/18, 361/89; 307/48, 151
See application file for complete search history.

(56) References Cited

U.S. PATENT DOCUMENTS

| | | | |
|---|---|---|---|
| 7,880,342 B2 * | 2/2011 | Bourgeau | 307/151 |
| 2002/0195821 A1 | 12/2002 | Wacknov | |
| 2005/0061561 A1 | 3/2005 | Leonardi et al. | |
| 2007/0069583 A1 | 3/2007 | Bourgeau et al. | |
| 2008/0270023 A1 | 10/2008 | Kumar | |
| 2009/0195074 A1 * | 8/2009 | Buiel | 307/48 |
| 2010/0118574 A1 | 5/2010 | Bourgeau | |

OTHER PUBLICATIONS

Int'l Search Report and Written Opinion of the Int'l Searching Authority dated Oct. 5, 2011, in related application PCT/US11/40120.

* cited by examiner

*Primary Examiner* — Danny Nguyen
(74) *Attorney, Agent, or Firm* — Fulbright & Jaworski L.L.P.

(57) ABSTRACT

A hybrid power plant is characterized by a substantially constant load on generators regardless of momentary swings in power load. Short changes in power load are accommodated by DC components such as capacitors, batteries, resistors, or a combination thereof. Resistors are used to consume power when loads in the power plant are generating excess power. Capacitors are used to store and deliver power when the loads in the power plant demand additional power. Reducing rapid changes in power load as seen by the generators allows the generators to operate at higher efficiencies and with reduced emissions. Additionally, power plants employing combinations of generators, loads, and energy storage devices have increased dynamic performance.

7 Claims, 10 Drawing Sheets

HYBRID POWER PLANT FOR IMPROVED EFFICIENCY AND DYNAMIC PERFORMANCE

TECHNICAL FIELD

This disclosure generally relates to power transmission networks. More specifically, this disclosure relates to operating a DC power system from one or more AC or DC power generators. Even more specifically, this disclosure relates to improving efficiency of an AC generators when connected to a DC bus by providing a nearly constant load to the generators.

BACKGROUND OF THE INVENTION

Power transmissions networks can be made of AC systems, DC systems, or a combination of the two. AC power networks have conventionally been used throughout the world. However, DC power networks have certain advantages. DC power networks are easier to design and implement because they introduce no reactance into the power system. Higher efficiencies from generators can be achieved in DC systems because only real power is transmitted. Additionally, parallelization of power supplies is simple because no synchronization is required when additional supplies or loads are brought onto the network.

Therefore, in power networks that experience large swings in load on the generators and require reliable operation, a combination of DC systems and AC systems is beneficial. One example of such a power network is found on drilling platforms or vessels to operate onboard thrusters. Drilling vessels are not anchored in the ocean but are dynamically controlled to maintain a desired position in the ocean. Thrusters are propeller drives that can have variable rotation speed and azimuthal angle of the blades. They are used to maintain a position within specified tolerances of a drilling apparatus. These thrusters are operated by a power supply onboard the drilling vessel. Any failure of the power supply can lead to displacement of the vessel out of the tolerances of the drilling apparatus. In such a case, the drilling apparatus would need to be mechanically decoupled and recoupled after the power supply is restored and the position of the drilling vessel is corrected.

One method of facilitating a reliable power supply is to utilize a DC bus for powering thrusters and other components. Such a power transmission system is demonstrated in FIG. 1. In such a system, the power supply is generally made of AC generators coupled to an AC-to-DC converter, such as AC-to-DC converter 112. The AC-to-DC converter places power from the AC generators on an intermediate DC bus. Each motor or thruster, as well as other devices utilizing the intermediate DC bus, on board the drilling vessel is coupled to the intermediate DC bus through a DC-to-AC converter.

FIG. 1 is a block diagram illustrating a conventional DC voltage bus coupling multiple AC voltage generation systems to various loads. Power system 100 includes generators 102. The generators 102 are coupled to an AC bus 104 through isolators 106. The isolators 106 allow the generators 102 to be removed from the AC bus 104 when they are not used or are malfunctioning. The AC bus 104 is coupled to a transformer 108 to condition power for transmission to a line 110. An AC-to-DC converter 112 is coupled to the line 110 and converts AC power on the line 110 to DC power for output onto an intermediate DC bus 120. Coupled to the DC bus 120 are DC-to-AC converters 130. The DC-to-AC converters 130 convert DC power on the DC bus 120 to AC power that most devices are designed to use. Coupled to the DC-to-AC converters 130 is a line 132 to which loads may be connected. A power dissipating device 134 is coupled to the line 132, and the power dissipating device 134 may be, for example, a thruster. Additionally, a transformer 135 is coupled to the line 132 to condition power for a load 136. The load 136 may be, for example, a light bulb.

Another example of the motor 134 may be the draw works onboard a drilling platform. The draw works is a machine that reels out and reels in the drilling line and conventionally includes a large-diameter steel spool, brakes, and a power source. Operation of the draw works to reel in drilling line may require the full capacity of the ship-board generators. However, there are operations conditions where the draw works may consume zero power. In reverse operation, the draw works may generate power that is placed back on the line 132 while gravity assists reeling out of the drilling line. The power load changes may occur nearly instantaneously.

Rapid changes in the load on the generator require the generator to increase power output to generate the power demanded by the load. Diesel generators are designed to consume fuel at an optimized rate in a small range of the available power output. Diesel fuel costs are the highest expense incurred by operating a diesel generator over its lifetime. Therefore, an operator desires to keep the generator operating in the power output range optimized for fuel consumption.

Turning now to FIG. 2, a power output curve for a diesel generator are examined. FIG. 2 is graph illustrating the operation of a diesel generator. A curve 220 represents fuel consumption in kilograms per kilowatt-hour of the diesel generator at various engine loads (power output). A range between 0 and 100 percent of rated output demonstrates a variation in the kg/(kw/hour) ratio, or efficiency of fuel consumption In order to operate efficiently a range 230 of power load on the diesel generator should be maintained. If the load increases or decreases, the engine fuel consumption and efficiency changes.

In addition to fuel consumption issues, scrubbers on diesel generators that reduce the dangerous exhaust are sensitive to the volume of exhaust. Rapidly varying engine power changes the rate of flow of exhaust and chemical components of the exhaust. Because the scrubber is designed to operate optimally on a continuous and stable flow of exhaust, emissions output may not be minimized if the power load varies rapidly.

Further, dynamic performance of diesel generators is limited. That is, diesel generators may not increase power output rapidly enough to match an increasing power load on the diesel generator. Conventionally, additional diesel generators would be brought online if the rate of increase of power load exceeds the rate of increase of diesel generator power output. Neither diesel generator is operating efficiently and results in increased fuel consumption and express capacity when the power load peaks.

Referring now to FIG. 3, generators and power loads will be examined in a conventional power plant. FIG. 3 is a block diagram illustrating power distribution on a conventional power plant 300. The power plant 300 includes an AC generator 302 coupled to a switchboard 308 through an AC line 306. The switchboard 308 is coupled to multiple loads. For example, typical shipboard and drilling loads are represented by a power dissipating device 312 coupled to the switchboard 308 by an AC line 310. Additionally, the switchboard 308 is coupled to an AC-to-DC converter 318. The AC-to-DC converter 318 is coupled to an AC line 316 and a DC line 320. Additional loads may be coupled to the DC line 320. For example, a light 322 may be coupled to the DC line 320 or a DC-to-AC converter 324. The DC-to-AC converter 324 couples to additional AC loads such as a power dissipating device 326. The power dissipating device 326 may be a draw works as described above or a motor. Each of the loads 312, 322, 326 produces different power loads on the AC generator 302. The effect on the AC generator 302 will now be examined.

FIGS. 4A to 4E are graphs illustrating power consumption in a conventional power plant such as FIG. 3. A line 402 in FIG. 4A indicates power consumption at the power dissipating device 312. Shipboard loads such as the power dissipating device 312 operate as a constant load over long periods of time such as hours on the AC generator 302. The line 402 is positive indicating consumption of power. A line 404 in FIG. 4B indicates power consumption at the power dissipating device 326. Draw works such as the power dissipating device 326 operate as a varying load, which may change rapidly such as in milliseconds, on the AC generator 302. The line 404 varies between positive and negative values indicating the load consumes power at some times and produces power at other times. A line 406 in FIG. 4C indicates power consumption at the light 322. The light 322 operates as a constant load over long periods of time such as hours on the AC generator 302.

Total power transferred through the AC-to-DC converter 318 is represented by adding the line 404 to the line 406 and is shown in a line 408 in FIG. 4D. The line 408 is total power consumption with respect to time of the DC line 320. Total power delivered by the AC generator 302 is shown in a line 410 in FIG. 4E and is a sum of lines 408, 402. In the conventional power plant 300 power delivered by the AC generator 302 varies in time. This leads to undesirable qualities exhibited by the AC generator 302 as indicated above including inefficient fuel consumption and poor exhaust scrubbing.

Thus, there is a need for a power plant design that produces a substantially constant load on the AC generators and increases dynamic performance.

BRIEF SUMMARY OF THE INVENTION

A power plant includes an AC generator, an AC-to-DC converter coupled to the AC generator and a DC bus, and a switch coupled to the DC bus. The power plant further includes an active power compensation system coupled to the switch. The active power compensation system reduces power load variations in the power plant. The switch may include a DC-to-DC converter. The active power compensation system may include power consumption devices. The power consumption devices may be resistors. The power plant may also include power storage devices. The power storage devices comprise ultracapacitors. The ultracapacitors may be coupled to one or more microcontrollers. The one or more microcontrollers may regulate the ultracapacitors. The power storage devices may include batteries or rotating machines.

A method of reducing variations in a power load on a generator includes routing power between the generator and a power consuming device during a time when the power load on the generator is lower than a first level. The power consuming device may include a resistive element. The first level may be based, in part, on a fuel efficiency of the generator.

A method of reducing variations in a power load on a power plant having a generator includes routing power between the generator and a energy storage device during a time when the power load on the power plant is lower than a first level. The energy storage device stores energy provided by the generator. The energy storage device may include at least one ultracapacitor. The energy storage device may include at least one battery. The first level may be based, in part, on a fuel efficiency of the generator. The method may also include routing power between the generator and the power storage device during a time when the power load on the power plant is higher than a second level. The second level may be higher than the first level. The energy storage device may deliver power to the power plant. The second level may be chosen, in part, based on a fuel efficiency of the generator. The method further includes routing power between the generator and a power consuming device during a time when the power load on the power plant is lower than a third level. The third level may be lower than the first level. The third level may be chosen based, in part, on a capacity of the energy storage device.

A power plant includes means for generating power to meet a power load of the power plant. The power plant also includes means for reducing variation in the power load of the power plant. The means for reducing variation may include means for consuming energy. The variation reducing means may include means for storing energy.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the technology of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present invention, reference is now made to the following descriptions taken in conjunction with the accompanying drawings.

DETAILED DESCRIPTION OF THE INVENTION

Reducing variation of the load on a generator in a power plant may be accomplished by adding devices that dissipate power during short times when power loads are volatile. In this arrangement, the generator may be able to continue operation at a higher output while the power dissipating devices remove power generated by some loads. Without the power dissipating devices to remove energy generated by the loads, the generators would reduce power output and allow other loads to absorb the regenerated power.

Figure 5:
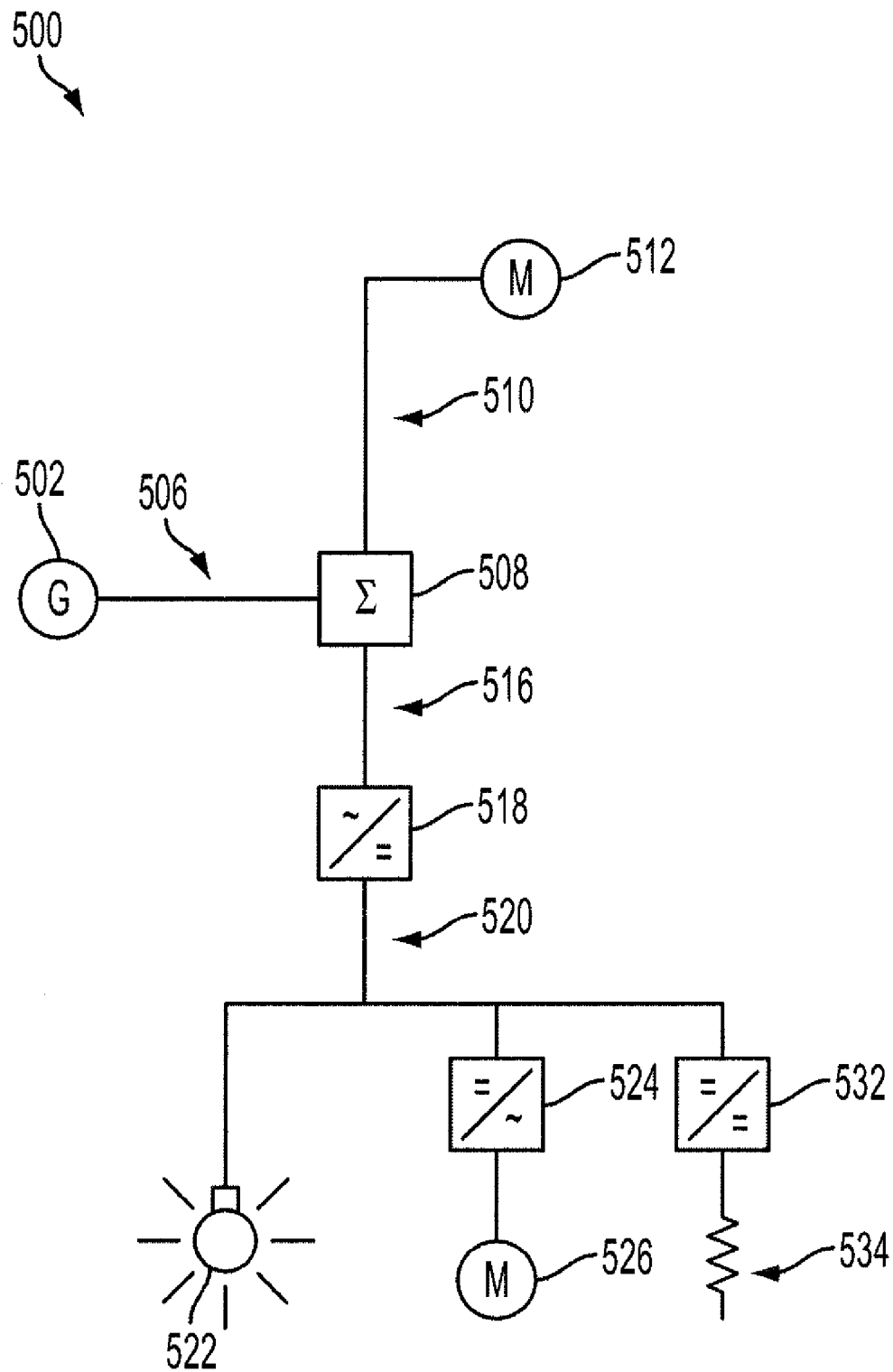
FIG. 5 is a block diagram illustrating power distribution on an exemplary power plant with power dissipating devices to consume regenerated energy according to one embodiment.

FIG. 5 is a block diagram illustrating power distribution on an exemplary power plant with power dissipating devices to consume regenerated energy according to one embodiment. A hybrid power plant 500 includes an AC generator 502 coupled to a switchboard 508 through an AC line 506. The switchboard 508 is coupled to the AC line 506 and an AC line 510. A power dissipating device 512 is coupled to the AC line 510. The power dissipating device 512 may represent, for example, shipboard loads. The switchboard 508 is also coupled to an AC-to-DC converter 518 through an AC line 516. The AC-to-DC converter 518 provides power to a DC line 520. A light 522 couples to the DC line 520. Additionally, a DC-to-AC converter 524 is coupled to a power dissipating device 526 and the DC line 520. The power dissipating device 526 may be a draw works as described above. Additionally, a DC-to-DC converter 532 couples a power dissipating device 534 to the DC line 520. The power dissipating device 534 may be any device capable of consuming energy. For example, the power dissipating device 534 may be a resistor, variable resistor, water brake, or a combination of the aforementioned devices. The power demand on the AC generator 502 from the loads 512, 522, 526, 534 will now be examined.

Referring to FIG. 6 the loads at various locations on the hybrid power plant 500 are examined. FIGS. 6A to 6F are graphs illustrating power consumption in an exemplary power plant with resistors to consume regenerated energy according to one embodiment. A line 602 in FIG. 6A indicates power consumption at the power dissipating device 512. Shipboard loads such as the power dissipating device 512 operate as a constant load over extended periods of time on the power plant. A line 606 in FIG. 6C indicates power consumption at the light 522. The light 522 operates as a constant load over extended periods of time on the hybrid power plant 500. A line 604 in FIG. 6B indicates power consumption at the power dissipating device 526. Draw works such as the power dissipating device 526 have a power load that varies rapidly with time in as small as millisecond intervals. In the case of power dissipating device 526, the power load is positive at some times and negative at other times. During the positive portion of the line 604 the power dissipating device 526 consumes power; during the negative portion of the line 604 the power dissipating device 526 delivers power to the power plant.

During a time when the power dissipating device 526 is delivering power to the hybrid power plant 500 the AC generator 502 will reduce power output to accommodate the regenerated power. As described above, the AC generator 502 loses efficiency when its power output is reduced or changes rapidly. Therefore, the power dissipating device 534 may be switched on by the DC-to-DC converter 532 to consume excess power on the DC line 520. This allows the AC generator 502 to continue operating at a nearly constant power output. A line 608 in FIG. 6D indicates power consumption by the power dissipating device 534. The line 608 is positive because the power dissipating device 534 is only capable of consuming power. The DC-to-DC converter 532 is switched on at times that it would be advantageous to add additional power consumption to the hybrid power plant 500. According to one embodiment, the line 608 represents power consumption substantially equal in magnitude to the line 604 during the period of time that the line 604 is negative. Therefore, the power dissipating device 534 consumes power generated by the power dissipating device 526. The DC-to-DC converter 532 may be switched on for a longer time or shorter time depending on the condition of other loads on the hybrid power plant 500.

Figure 1:
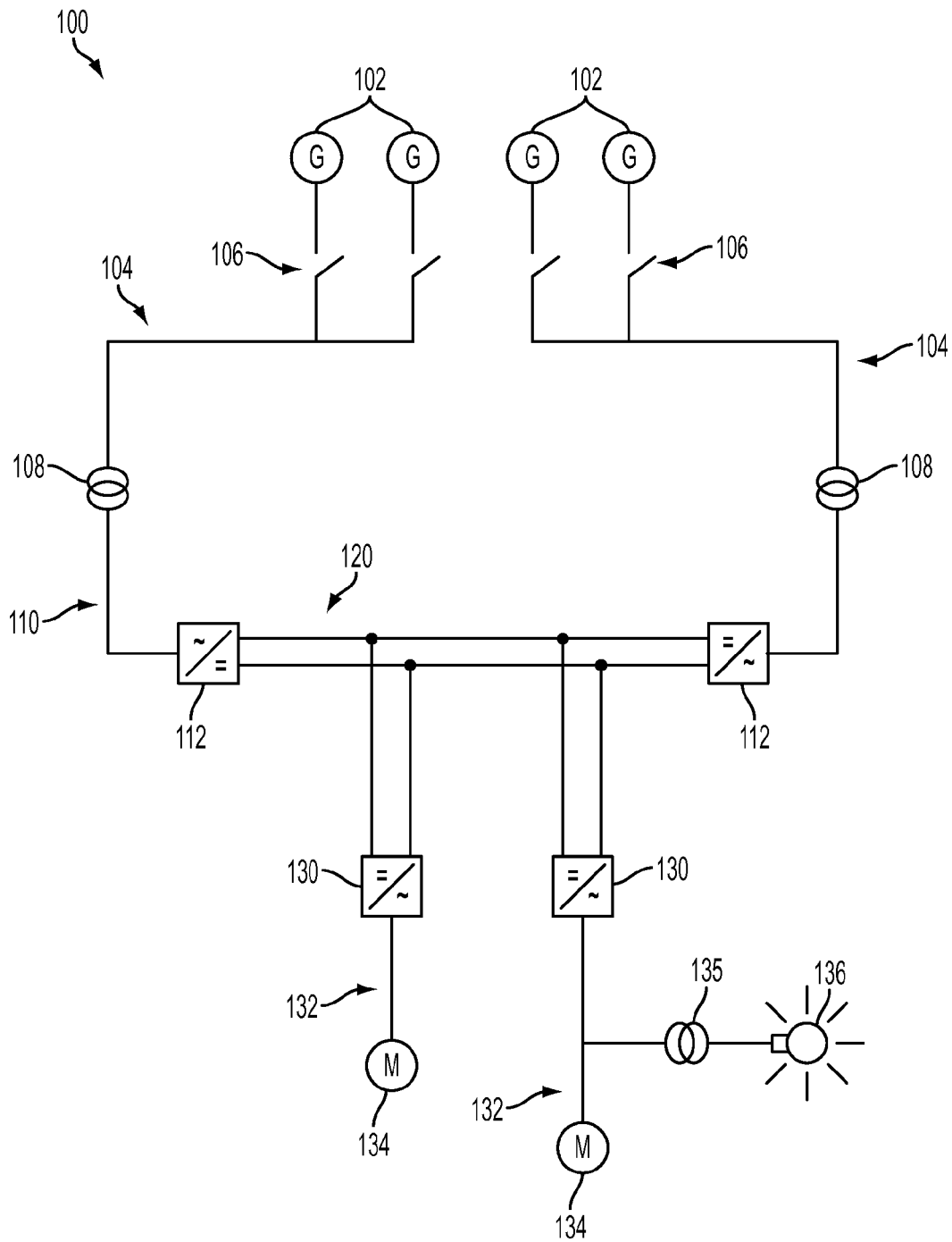
FIG. 1 is a block diagram illustrating a conventional DC voltage bus coupling multiple AC voltage generation systems to various loads.
Figure 2:
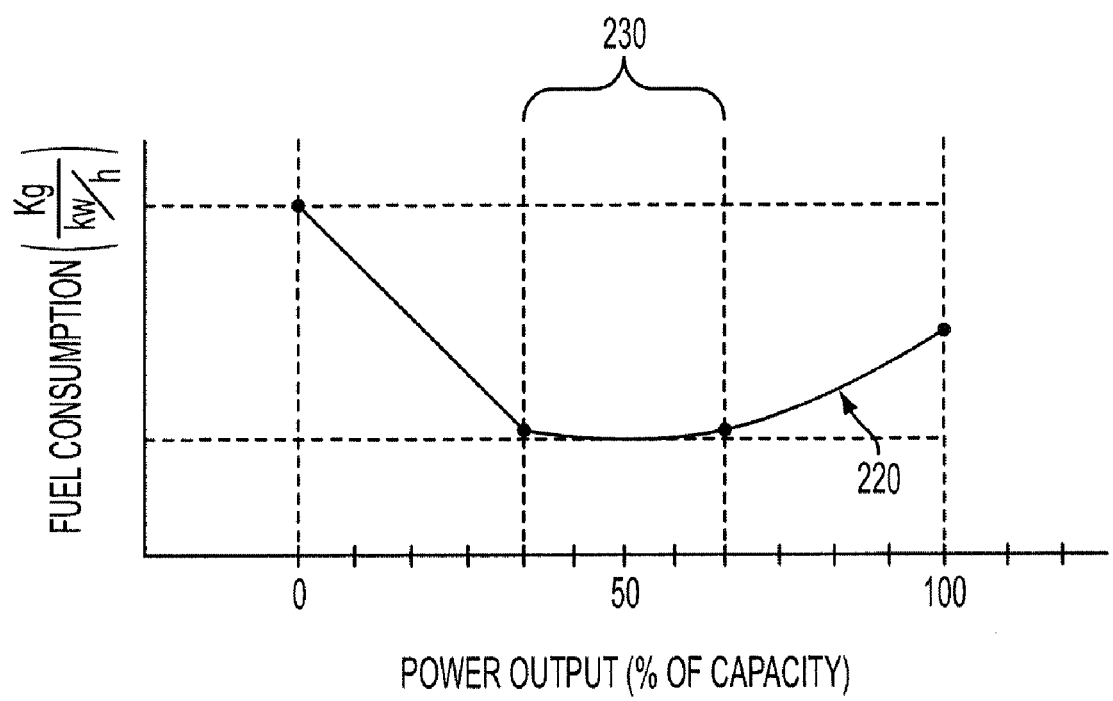
FIG. 2 is a graph illustrating the operation of a diesel power generator.
Figure 3:
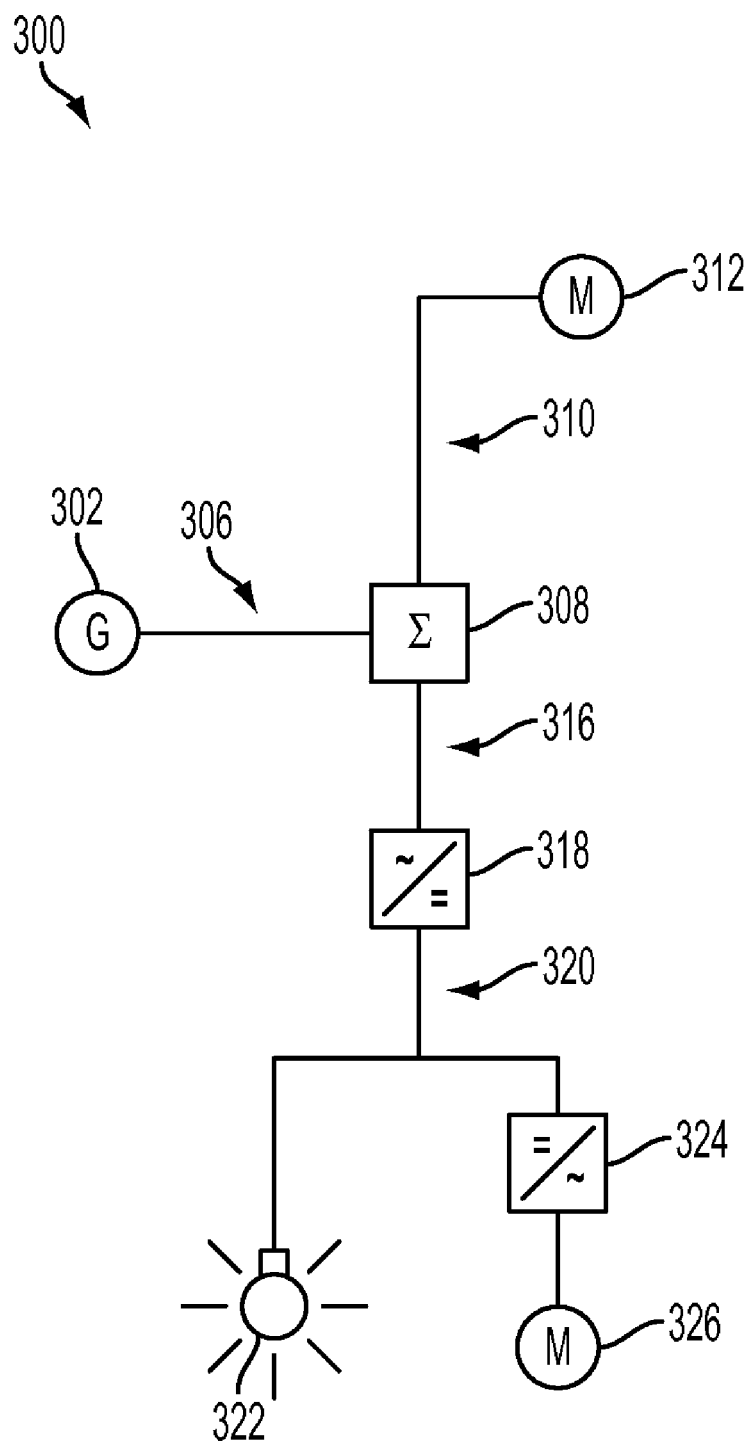
FIG. 3 is a block diagram illustrating power distribution on a conventional power plant.
Figure 4A:
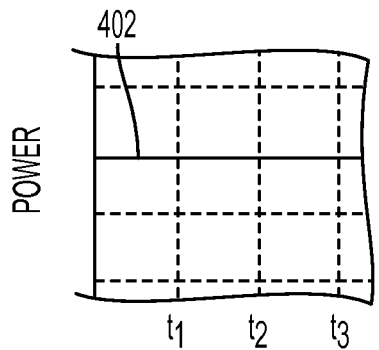
FIGS. 4A to 4E are graphs illustrating power consumption in a conventional power plant such as FIG. 3.
Figure 4B:
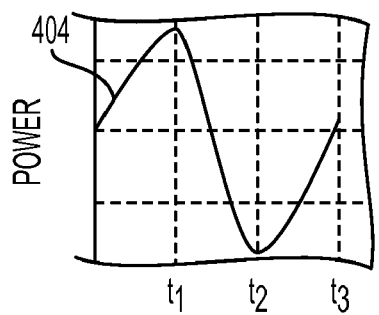
Figure 4C:
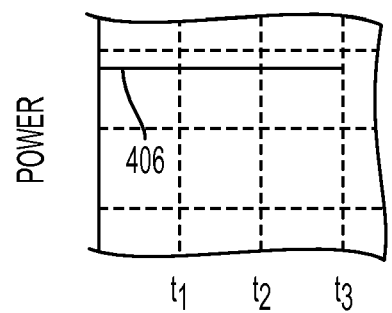
Figure 4D:
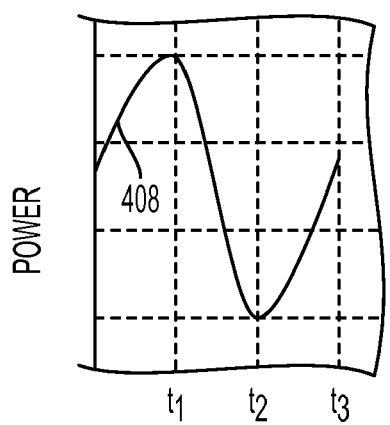
Figure 4E:
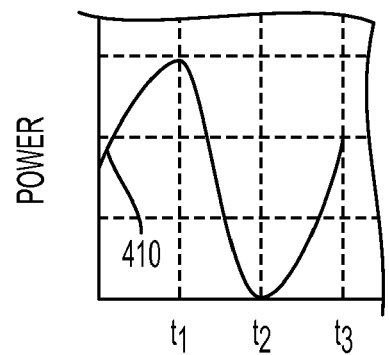
Figure 6A:
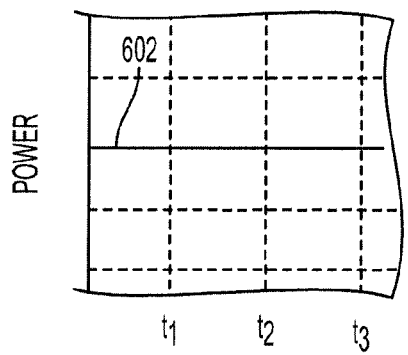
FIGS. 6A to 6F are graphs illustrating power consumption in an exemplary power plant with resistors to consume regenerated energy according to one embodiment.
Figure 6B:
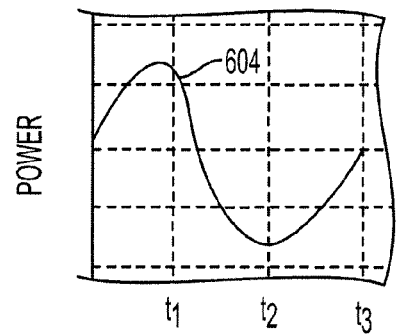
Figure 6C:
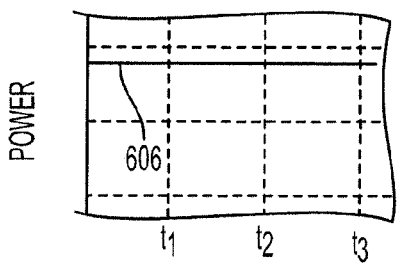
Figure 6D:
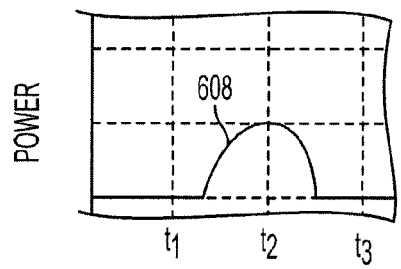
Figure 6E:
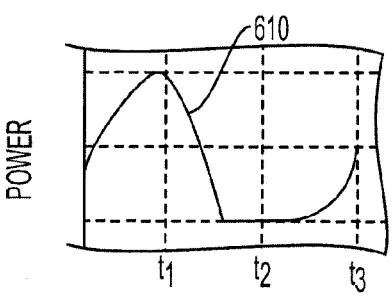
Figure 6F:
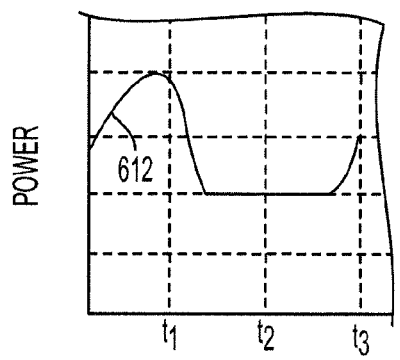

Total power transferred through the AC-to-DC converter 518 is indicated by a line 610 in FIG. 6E. The line 610 is a summation of the lines 604, 606, 608. Total power delivered by the AC generator 502 is indicated by a line 612 in FIG. 6F. The line 612 is a summation of the lines 610, 602. The line 612 indicates the load on the hybrid power plant 500 is confined to a more narrow range than that of the line 410 in FIG. 4E in which no power dissipating device is implemented. For example, the line 612 has a minimum of 1 MW whereas the line 410 has a minimum of 0 MW The addition of the power dissipating device 534 and the DC-to-DC converter 532 limits power output reduction of the AC generator 502 when one of the loads in the hybrid power plant 500 generates power. The most inefficient operating range of the AC generator 502 is at low power output, therefore, efficiency of the AC generator 502 in the hybrid power plant 500 is improved by not operating the AC generator 502 at low power loads.

The power plant may be further adapted to increase efficiency if the energy generated by loads may, instead of being dissipated, be stored and used at a later time when power demand increases. As a result, an increase in load on the power plant would result in a discharge of the stored energy allowing the AC generator to continue operating at a nearly constant engine power load. A system for storing energy and delivering energy depending on conditions in the power plant is referred to as an active power compensation system.

Figure 7:
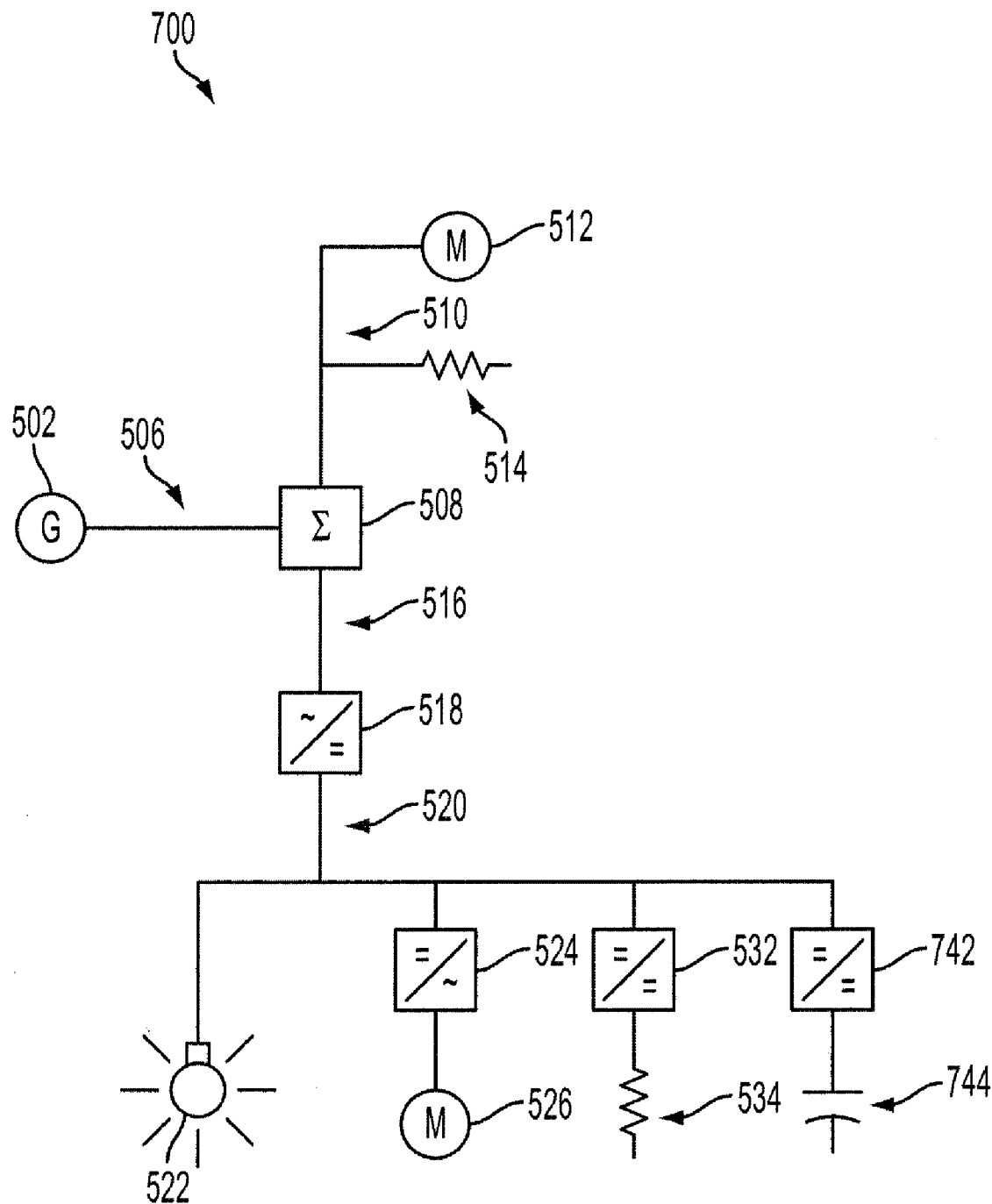
FIG. 7 is a block diagram illustrating power distribution on an exemplary power plant with active power compensation according to one embodiment.
Figure 8A:
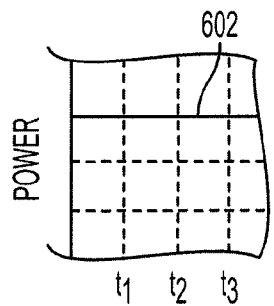
FIGS. 8A to 8G are graphs illustrating power consumption in an exemplary power plant with active power compensation according to one embodiment.
Figure 8B:
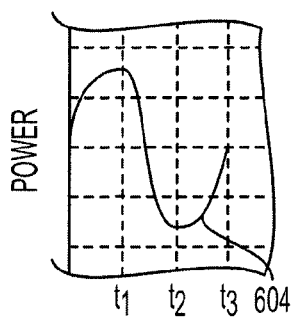
Figure 8C:
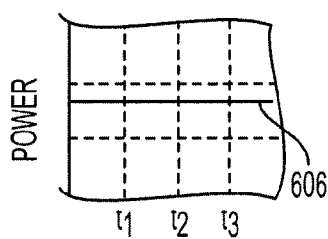
Figure 8D:
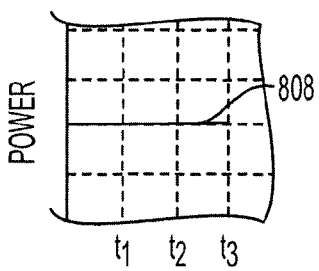
Figure 8E:
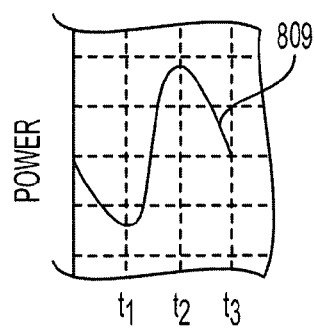
Figure 8F:
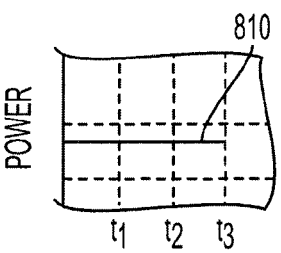
Figure 8G:
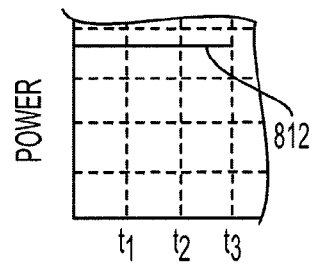

FIG. 7 is a block diagram illustrating power distribution on an exemplary power plant with active power compensation according to one embodiment. A hybrid power plant 700 includes an energy storage device 744 coupled to the DC line 520 through a DC-to-DC converter 742. The energy storage device 744 may be switched on by the DC-to-DC converter 742 when additional power should be delivered to the DC line 520. The energy storage device 744 may also be switched on at times when excess power is delivered to the DC line 520 such that the energy may be stored by the energy storage device 744. The energy storage device 744 may be any energy storing device including, but not limited to, spring tension, fuel cells, flywheels, capacitors, variable capacitor, ultracapacitors, batteries, or a combination of the aforementioned devices. In addition to energy storage device 744, the hybrid power plant 700 may, in one embodiment, also include the power dissipating device 534 coupled to the DC-to-DC converter 532.

Turning now to FIG. 8, the load on the hybrid power plant 700 at various locations will be examined. FIGS. 8A to 8G are graphs illustrating power consumption in an exemplary power plant with active power compensation according to one embodiment. The lines 602, 604, 606 of FIGS. 8A, 8B, and 8C, respectively, are identical to those in FIG. 6. A line 809 in FIG. 8E indicates power load of the energy storage device 744. The line 809 has substantially the same magnitude as the line 604, but of opposite polarity. The line 809 is a minor image of the line 604. The energy storage device 744 stores energy during periods of excess power generation and delivers energy during periods of power generation shortage. As a result, variations in power load on the AC generator 502 are reduced. The reduction is a result of the energy storage device 744 consuming power during time that the power dissipating device 526 and delivering that power back to the hybrid power plant 700. A line 808 in FIG. 8D indicates the power load on the power dissipating device 534. Power load at the AC-to-DC converter 518 in the hybrid power plant 700 is indicated by a line 810 in FIG. 8F. The line 810 is a summation of the lines 808, 809, 606, 604 and is a substantially constant value. A line 812 in FIG. 8G indicates total power load on the AC generator 502 and is a summation of lines 810, 602 and is also a nearly constant value.

Thus, the use of the energy storage device 744 reduces the effects of a varying power load on the AC generator 502. The energy storage device 744 may adapt to changes in the power load of the power dissipating device 526 and other loads in the hybrid power plant 700. The nearly constant power load on the AC generator 502 allows for continuous operation in the most efficient operating region of the AC generator 502. Additionally, the energy storage device 744 increases dynamic performance of the hybrid power plant 700. The AC generator 502 in response to an increasing power load may not be capable of increasing output quickly enough to match the increasing power load. The energy storage device 744 may have a shorter response time to the increasing power load and deliver additional power while the AC generator increases output to match the power load on hybrid power plant 700. According to one embodiment, the improved dynamic performance of the hybrid power plant 700 having the energy storage device 744 allows the AC generator to remain at a substantially constant power output.

Figure 9A:
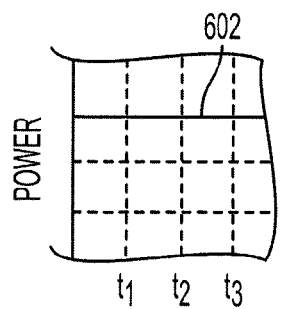
FIGS. 9A to 9G are graphs illustrating power consumption in an exemplary power plant with active power compensation and a capacity limited energy storage device according to one embodiment.
Figure 9B:
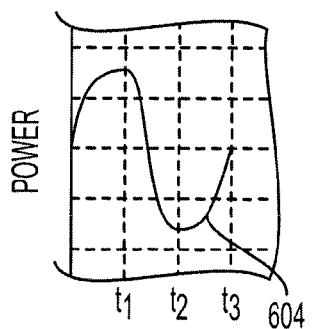
Figure 9C:
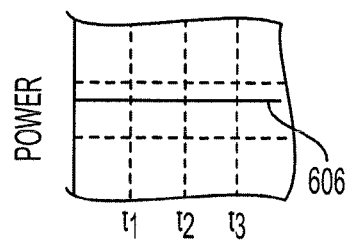
Figure 9D:
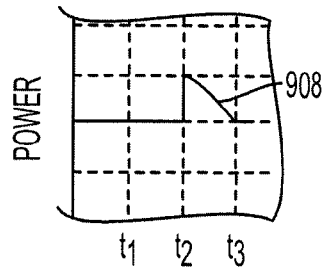
Figure 9E:
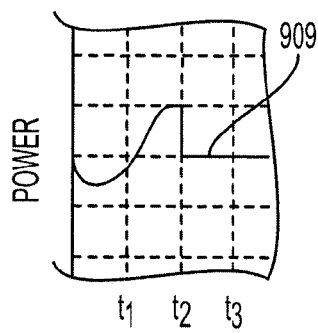
Figure 9F:
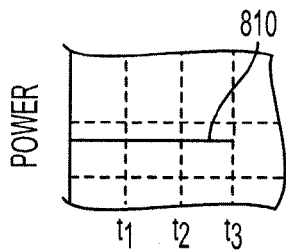
Figure 9G:
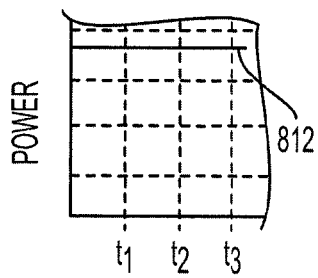

The power dissipating device 534, in one embodiment, is used to consume power when power generation by the power dissipating device 526 exceeds a capacity of the energy storage device 744. FIGS. 9A to 9G are graphs illustrating power consumption in an exemplary power plant with active power compensation and a capacity limited energy storage device according to one embodiment. The line 909 in FIG. 9E represents power at the energy storage device 744. According to one embodiment, the energy storage device 744 has an energy capacity of 1 megaJoule. During power consumption of line 604, the line 909 is negative indicating the energy storage device 744 is providing power. During power generation of the line 604, the line 909 is positive indicating the energy storage device 944 is storing power. As the energy storage device 744 reaches a maximum energy capacity at time $t_2$, the power dissipating device 534 will engage to absorb regenerated power from the load 526 in order to maintain a substantially constant load on the AC generator 502. The actual energy capacity of the energy storage device 744 may vary from the embodiment demonstrated. The line 908 in FIG. 9D illustrates that during the portion of time that the energy storage device 744 is near capacity, the power dissipating device 534 consumes power. As a result, the summation of the switchboard 508 yields the same power load as in FIG. 8.

Figure 10:
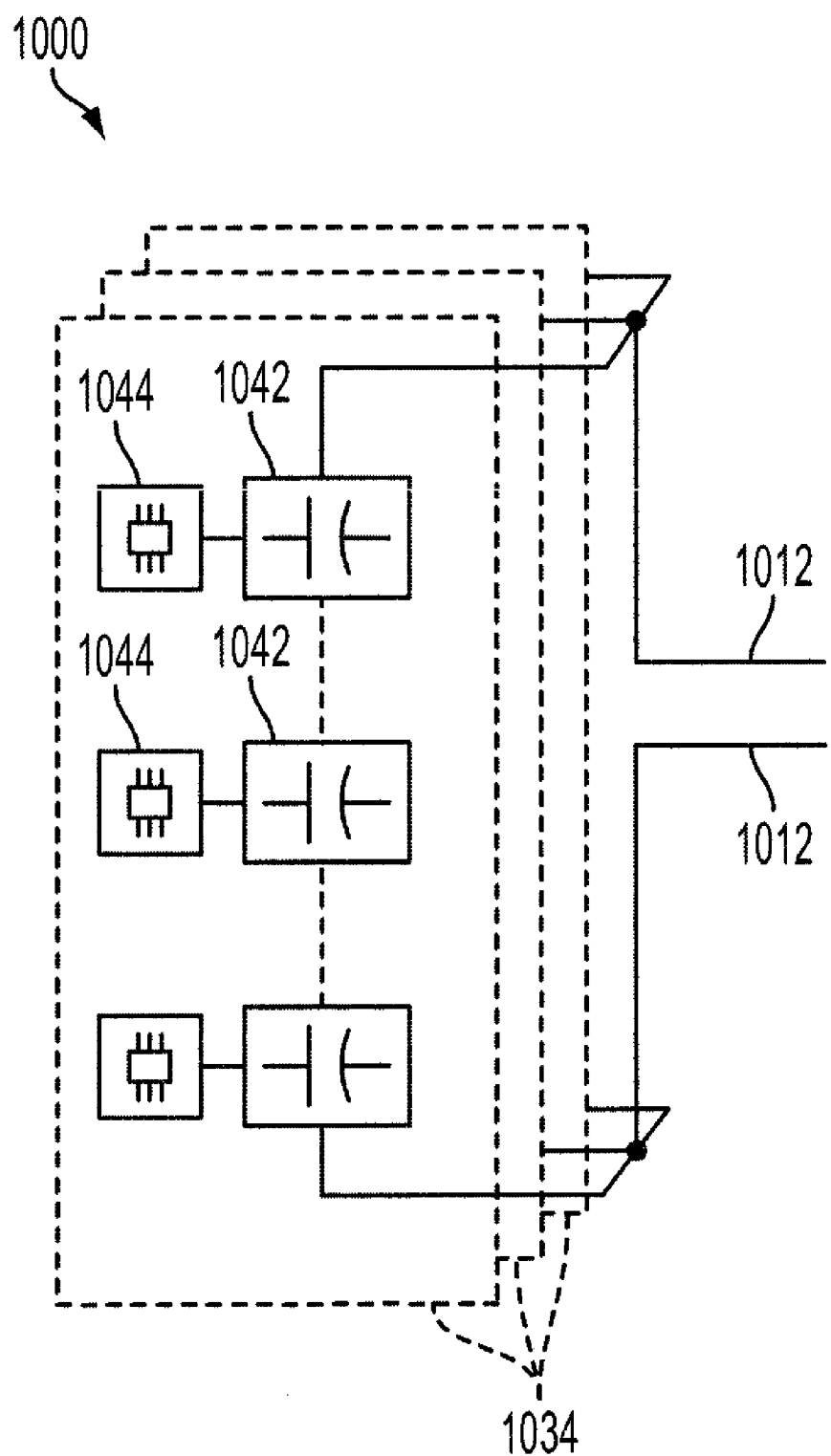
FIG. 10 is a block diagram illustrating an exemplary active power compensation system according to one embodiment.

FIG. 10 is a block diagram illustrating an exemplary active power compensation system according to one embodiment. An active power compensation system 1000 may be employed to store and deliver energy to the hybrid power plant 700. An input line 1012 is used to connect the active power compensation system to a power plant. The active power compensation system 1000 includes several columns 1034 of power storage devices. Each column 1034 includes energy storage devices 1042. The energy storage devices 1042 may be, for example, ultracapacitors, capacitors, batteries, or fly wheels. The energy storage devices 1042 are stacked in series to obtain a desired voltage and in columns 1034 to obtain a desired current or optimal energy density. The energy storage devices 1042 are controlled by microcontrollers 1044 to regulate charging and discharging activities. For example, the microcontrollers 1044 may disconnect defective or damaged power storage devices 1042 from the columns 1034.

Examples of hybrid power plants for drilling vessels including shipboard loads have been shown in the above embodiments. However, the power plants as disclosed may be adapted for use in a number of other applications. Additionally, the power plants may include AC or DC generators and loads. AC-to-DC, DC-to-AC, and DC-to-DC converters as shown in the figures above may be unidirectional or bidirectional. One of ordinary skill in the art would be capable of substitution, e.g., an AC-to-DC for a DC-to-AC converter, depending upon load configuration and characteristics (i.e., DC load or AC load) of a particular power plant.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A power plant, comprising:
    an AC generator coupled to an AC bus;
    an AC-to-DC converter coupled to the AC bus and a DC bus;
    a switch coupled to the DC bus;
    an AC load coupled to the AC bus;
    a DC load coupled to the DC bus; and
    an active power compensation system coupled to the switch, wherein the active power compensation system reduces power load variations in the power plant by delivering power to the AC load through the AC-to-DC converter when a power output of the AC generator is lower than a power demand of the AC load.

2. The power plant of claim 1, in which the switch comprises a DC-to-DC converter.

3. The power plant of claim 1, in which the active power compensation system comprises power consumption devices to consume power when a load on the power plant decreases.

4. The power plant of claim 3, in which the power consumption devices are resistors.

5. The power plant of claim 3, in which the active power compensation system further comprises at least one energy storage device to provide energy when the load on the power plant increases.

6. The power plant of claim 1, in which the at least one energy storage device comprises at least one of an ultracapacitor, a capacitor, a battery, and a fly wheel.

7. The power plant of claim 6, in which the at least one energy storage device is coupled to one or more microcontrollers, wherein the one or more microcontrollers regulate the at least one energy storage device.

* * * * *